United States Patent [19]

Bergman et al.

[11] Patent Number: 4,684,399

[45] Date of Patent: Aug. 4, 1987

[54] TANTALUM POWDER PROCESS

[75] Inventors: Roger M. Bergman, Sanatoga; Charles E. Mosheim, Hereford Township, Berks County, both of Pa.

[73] Assignee: Cabot Corporation, Waltham, Mass.

[21] Appl. No.: 913,159

[22] Filed: Sep. 29, 1986

Related U.S. Application Data

[63] Continuation-in-part of Ser. No. 835,915, Mar. 4, 1986, abandoned.

[51] Int. Cl.$^4$ ............................................. C22B 34/20
[52] U.S. Cl. ................................................. 75/0.5 BB
[58] Field of Search ..................................... 75/0.5 BB

[56] References Cited

U.S. PATENT DOCUMENTS

| | | | |
|---|---|---|---|
| 4,141,720 | 2/1979 | Vartanian | 75/0.5 BB |
| 4,149,876 | 4/1979 | Rerat | 75/0.5 BB |
| 4,445,931 | 5/1984 | Worthington | 75/0.5 BB |
| 4,508,563 | 4/1985 | Bernard et al. | 75/0.5 BB |
| 4,537,641 | 8/1985 | Albrecht et al. | 75/0.5 BB |
| 4,582,530 | 4/1986 | Heinrich et al. | 75/0.5 BB |

FOREIGN PATENT DOCUMENTS 38-8 of 1963 Japan.
43-25910 of 1968 Japan.

*Primary Examiner*—Wayland Stallard
*Attorney, Agent, or Firm*—Robert J. Feltovic

[57] ABSTRACT

A reduction process for producing tantalum powder wherein a tantalum compound is introduced, in a continuous or incremental manner, to a reactor, during the course of the reduction reaction.

10 Claims, No Drawings

TANTALUM POWDER PROCESS

This application is a continuation-in-part of Ser. No. 835,915 filed Mar. 4, 1986, and now abandoned.

Solid tantalum capacitors typically are manufactured by compressing tantalum powder to form a pellet, sintering the pellet in a furnace to form a porous body, and then subjecting the body to anodization in a suitable electrolyte to form a continuous dielectric oxide film on the sintered body.

Development of tantalum powder suitable for solid capacitors has resulted from efforts by both capacitor producers and tantalum processors to delineate the characteristics required of tantalum powder in order for it to best serve in the production of quality capacitors. Such characteristics include surface area, purity, shrinkage, green strength, and flowability.

Most importantly, the tantalum powder should feature an adequate surface area. Since the capacitance of a tantalum anode is a function of surface area, the greater the surface area of the tantalum powder after sintering, the greater the capacitance of the anode produced from that powder.

Purity of the powder also is a critical factor. Metallic and non-metallic contamination serve to degrade the dielectric. High sintering temperatures tend to remove some of the volatile contaminants. However, as high temperatures reduce the net surface area and thus the capacitance of the capacitor, minimizing the loss of surface area under sintering conditions is a requisite in order to maintain the capacitance of the tantalum powder.

The flowability of the tantalum powder and the green strength (mechanical strength of unsintered anodes) are critical parameters for the capacitor producer in order to accommodate efficient production. The flowability of the powder allows smooth die feeding in anode pressing operations; high green strength permits product handling and transport without excessive breakage.

Various techniques have been practiced for the production of tantalum powders by reduction of a tantalum compound with a reducing metal. Typical techniques, as briefly outlined in U.S. Pat No. 4,149,876, are reviewed below.

Potassium fluotantalate ($K_2TaF_7$) can be electrolytically reduced to tantalum in a molten bath with diluent chloride and fluoride salts of sodium and potassium. Production rate is limited to the electrolysis parameters of current and voltage. Since the concentration gradients established prevent obtaining a high yield, the production rate is relatively low. The resulting tantalum powders tend to be coarse and dendritic, and produce anodes for electrolytic capacitors having very low capacitive charge. Considerable impurities are transferred to the product due to the galvanic corrosive activity on the reaction vessel components.

Tantalum powder also can be made by exothermic reaction in a closed vessel wherein the $K_2TaF_7$ is arranged in alternate layers with reducing agent. The enclosed charge is indirectly heated until the exothermic reaction is spontaneously initiated. The ensuing uncontrollable reaction produces powders having a wide range of particle sizes. Although these powders have larger surface areas per unit weight than electrolytic powders, they must be classified extensively in order for them to be usable in the manufacture of anodes for electrolytic capacitors.

Commonly, tantalum powder is commercially produced by adding sodium to $K_2TaF_7$ which has been previously dissolved in molten salt. In this method the $K_2TaF_7$ and diluent salts are heated in a reaction vessel to a temperature above the melting point of the salt mixture. Molten sodium then is added. The bath is held at essentially isothermal conditions, with stirring of the bath effected by an internal agitator. The resulting powder has a wide range of particle sizes. In order for these materials to be acceptable for the manufacture of anodes for electrolytic capacitors, they may require extensive classification to obtain the desired particle size distributions. The capacitive charge that can be obtained from anodes derived from these powders typically is in the intermediate range.

A modification of this stirred liquid phase reaction scheme involves the introduction of diluent salts to the stirred reaction bath. The addition of diluents such as NaCl and KCl to the $K_2TaF_7$ allows the use of lower bath temperatures. However, this modified process results in agglomerates of finely divided material, a tendency to pick-up impurities, and production of excessive fines.

In another method, solid diluent salt and $K_2TaF_7$ are mulled with liquid sodium and the mixture is heated to the point of initiating a spontaneous exothermic reaction. This exothermic reaction is not easily controlled and, therefore, the product characteristics include varying particle sizes, broad particle size distributions, and varying electrical characteristics. These materials require classification to remove fine and coarse particles from the finished product prior to their utilization in the manufacture of anodes for electrolytic capacitors.

As discussed above, the capacitance of a tantalum pellet is a direct function of the surface area of the sintered powder. Greater surface area can be achieved, of course, by increasing the grams of powder per pellet, but, cost considerations have dictated that development be focused on means to increase the surface area per gram of powder utilized. Since decreasing the particle size of the tantalum powder produces more surface area per unit of weight, effort has been extended into ways of making the tantalum particles smaller without introducing other adverse characteristics that often accompany size reduction.

Various tantalum powder process techniques have been practiced in an attempt to maximize the production of a powder having a select, small desired particle size. For example, U.S. Pat. No. 4,149,876 teaches techniques for controlling particle size of tantalum powder product in a reduction process wherein molten sodium is added to a molten bath of $K_2TaF_7$ and a diluent salt. This patent defines the period of the overall reaction during which the temperature of the charge increases from the initial bath temperature to the reduction temperature as the "nucleation period". During this period of nucleation the rate of sodium addition was controlled. When it was desired to produce very fine particle size tantalum powder to be used in the manufacture of anodes employed in the manufacture of high capacitive charge electrolytic capacitors, the sodium metal was added at a very high rate until the reduction temperature is reached. It was reported that the rate of sodium injection (feed rate into the reactor) during the nucleation period has an inverse effort on the particle size of the finished product. More specifically, it was taught that the average size of the finished product was inversely related to the rate of temperature rise with respect to time during the nucleation period, and also to the time to complete the addition of the required stoichoimetric amount of sodium at that specified reduction temperature, called the "growth period".

Another factor taught to achieve finer particle size tantalum powders is the use of large amounts of diluents such as NaCl, which also can serve as an internal heat absorber or heat sink in the system.

A further factor that was said to produce fine particle size tantalum product is the starting of the sodium injection into the molten bath at the lowest possible temperature. Starting at a low temperature reportedly consumed proportionally large amounts of sodium for any given rate of temperature increment and consequently reduced the overall process time.

Another important factor in the control of particle size was described to be the temperature of reduction. Temperatures from about 760° to about 850° C. tended to produce smaller particles, while the temperatures from about 850° to about 1000° C. tended to produce somewhat larger particles.

A critical element in connection with the maintenance of rapid temperature rise at large sodium injection rates was defined to be the extraction of a portion of the heat generated by the reaction

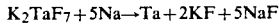

$$K_2TaF_7 + 5Na \rightarrow Ta + 2KF + 5NaF$$

by means for forced cooling of the reaction mass in the reaction vessel. Usage of forced cooling was reported to significantly reduce the overall process time and further reduced the particle size for the powder produced.

According to the teachings of U.S. Pat. No. 4,149,876, it ws prticularly advantageous to use the above-described techniques, in combination—large amounts of diluent salt, low initial molten bath temperature, very fast sodium feed rate, and use of forced cooling to maintain constant temperature during the growth period—to produce a uniform, fine particle size tantalum powder.

In all the previous reaction schemes outlined above, wherein tantalum powder is produced by reducing a tantalum compound with a reducing metal, the reactants either are mixed together and then heated in a closed vessel until exothermic reaction is spontaneously initiated, or, a molten bath of the tantalum compound is maintained and reducing metal is fed into the bath so as to reduce the tantalum compound to tantalum powder.

In Japanese Patent Disclosure Sho 38-8 (1963), it was shown that a tantalum metal product suitable for metallurgical purposes could be made by a method wherein $K_2TaF_7$ crystals, heated to a temperature below about 500° C. are gradually dropped into a bath of sodium maintained at a temperature near its boiling point.

A later Japanese Patent Disclosure Sho 43-25910 (1968) reviewed the above-cited Japanese disclosure and stated that while the earlier reference disclosed a method for producing a tantalum product featuring purity favorable for metallurgical utility, such a product having a particle size range from less than 5 microns to more than 100 microns would be unsuitable for capacitor applications. This later reference then proceeds to disclose a modification of the earlier method wherein molten $K_2TaF_7$, including diluents, is added slowly to a stirred molten sodium bath. A tantalum powder of between 5 microns and 100 microns, having a specific surface area less than about 750 cm$^2$/g, is described as being produced. However, while this reference defines this product as being capacitor grade tantalum powder, by current standards, this powder now would feature unacceptably low capacitance for capacitor utility.

Now, according to the present invention, a reaction scheme for producing tantalum powder has been devised wherein, in opposite fashion to previous commercial methods, a tantalum compound is added in a continuous or incremental manner to a reactor during the course of the reaction with a reducing metal. By employing such a reduction process, a tantalum powder can be produced featuring such characteristics so as to achieve anodes having improved capacitance. Tantalum powders produced according to the present process are characterized by high surface areas, which high surface areas flow from the fine particle size and narrow particle size distributions attendant the process.

According to the present invention, a tantalum compound is reduced to tantalum metal by reaction with a reducing metal wherein the tantalum compound is introduced to the reactor in a continuous or incremental manner during the course of the reduction reaction. The rate of continuous addition or the amount of each increment can be varied depending on the particular tantalum powder product characteristics desired. Continuous addition or smaller increments tend to favor increased capacitance. The tantalum compound may be any compound reducible to tantalum metal by reaction with a reducing metal. The compound may be utilized in any physical state that is convenient or desirable. Such compounds typically may include potassium fluotantalate ($K_2TaF_7$), sodium fluotantalate ($Na_2TaF_7$), tantalum chloride ($TaCl_5$), and mixtures thereof. The preferred tantalum compound is potassium fluotantalate. Preferably, the $K_2TaF_7$ is introduced as a solid.

The reducing metal may be any metal capable of reducing the tantalum compound to tantalum metal. Such metals typically include sodium (Na), potassium (K), and mixtures thereof. The preferred reducing metal is sodium.

The reducing agent may be added to the reactor as one unitary charge prior to the introduction of the tantalum compound; however, it preferably is introduced in a continuous, incremental, or semi-continuous manner during the course of the reduction reaction. The rate of introduction of the reducing metal into the reactor in relation to the rate of introduction of the tantalum compound, can be manipulated to produce the particular tantalum powder product desired, featuring the particle size and sintering characteristics required for commercial high capacitance powder. Excess reducing metal present during the course of reaction in relation to the tantalum compound present tends to favor decreased particle size and increasd capacitance of tantalum product.

In general, it has been found that when conducting a batch-type reduction wherein sodium is introduced continuously or semi-continuously into the reactor at the typical rate ranging from about 0.2 to about 15.0 pounds (0.09–6.8 kg) per minute, $K_2TaF_7$ semi-continuous addition in increments of about one third to about one tenth of the total $K_2TaF_7$ charge produces favorable results. Adjustment of the timing of $K_2TaF_7$ addition to maintain a portion of unreacted $K_2TaF_7$ in the reactor can be manipulated to allow controlled grain growth of tantalum product as another means to produce any specific desired tantalum powder product. Sufficient agitation of the reactants is maintained during the course of the reaction, so as to ensure complete reduction of $K_2TaF_7$.

Reaction temperature with $K_2TaF_7$ and Na typically ranges from about 600° to about 950° C. (873°–1223° K). Higher temperatures may serve to eliminate some contaminants from the product, but also may tend to reduce tantalum powder capacitance.

The following examples are provided to further describe the invention. The examples are intended only to be illustrative and not limiting in nature.

Examples 1 and 3 below represent typical prior art reduction techniques where a reducing metal is fed into an agitated mxture of a tantalum compound and diluent salts.

Examples 2, 4, 5, and 6 employ conditions, reactants, and diluent quantities matching those of one or the other of the comparative examples; in these representative examples, however, the reducing metal was continuously added to the reactor and the tantalum compound was introduced in an incremental manner (discrete increments ranging in number from 3 to 10) during the course of the reduction reaction. A slight excess of unreacted tantalum compound was maintained during the reaction. Example 7 illustrates a reaction in which all of the reducing metal and diluent salts first are added to the reactor and then the tantalum compound is continuously introduced into the reactor. In Example 8, both the reducing metal and the tantalum compound are added incrementally to the reactor during the course of the reduction. A slight excess of reducing metal is maintained during the reaction. Example 9 represents a reaction in which both the reducing metal and the tantalum compound are continuously introduced into the reactor during the course of the reaction. The examples demonstrate a marked increase in the capacitance of anodes made from the tantalum powder produced pursuant to the present invention.

The as-reduced Ta powders produced pursuant to the present invention featured Fisher sub-sieve particle sizes less than 5 microns and BET surface areas greater than about 2000 cm$^2$/g.

The testing procedures for the determination of the capacitance values are as follows:

PROCEDURE FOR CAPACITANCE DETERMINATION (a) Pellet Fabrication:

The tantalum powder was compressed in a commercial pellet press without the aid of binders. The pressed density was 5.0 g/cc using a powder weight of 0.470 g and a diameter of 4.95 mm.

(b) Vacuum Sintering:

The compacted pellets were sintered in a high vacuum of less than $10^{-5}$ torr (0.00133 Pa) for 30 minutes ($1.8 \times 10^3$ seconds) at a temperature of 1480° C. or 1560° C. (1753° K or 1833° K), depending upon the test desired.

(c) Anodization:

The sintered pellets were anodized in a forming bath at 90°±2° C. (363°±2° K) to 50 or 80 V DC. The electrolyte was 0.1% phosphoric acid. The anodization rate was controlled to be 1 volt per minute (60 seconds). After a period of 3 hours (1.08–10$^4$ seconds) at 50 or 80 V DC, the pellets were washed and dried.

(d) Testing Conditions:

The anodized sintered pellets were tested for capacitance in a 10 volume % $H_3PO_4$ electrolyte at 21° C. (294° K). The counterelectrode was a platinized silver test cell of adequate surface area. The capacitance measurement was a charge transfer determination using a Hickok Capacitance Meter, Model DP-200.

Surface area determinations were conducted using the nitrogen Brunauer, Emmett, Teller (BET) method.

Particle sizes were determined using the Fisher sub-sieve procedure (ASTM 30 B330-82).

COMPARATIVE EXAMPLE 1

A nickel reactor of appropriate size, fitted with a lid, agitator, thermowell, gas inlet and outlet ports, and loading ports, was placed in a furnace and flushed with argon. Argon flow was maintained throughout the run as a protective atmosphere. Three hundred pounds (136 kg) of alkali halide diluent salts were charged to the reactor and the temperature was raised to 825° C. (1098° K) to melt the salts under agitation. At this point 280 pounds (127 kg) of $K_2TaF_7$ was added with agitation, the $K_2TaF_7$ dissolved in the diluent salts, and the temperature was brought back to 825° C. (1098° K). Liquid sodium was added at 0.7 pounds (0.32 kg)/minute (60 seconds) until 82.6 pounds (37.5 kg) of sodium had been added. The temperature of the reduction was maintained at 825° C. (1098° K). After all the sodium had been added, the reduction mass was heated to 900° C. (1173° K) for 4 hours ($1.44 \times 10^4$ seconds) under argon to insure completeness of the reduction of $K_2TaF_7$ to tantalum metal. The reactor was cooled to room temperature under argon flow and the contents were removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 4500 cm$^2$/g.

A sample of product tantalum powder was screened to $-60$ mesh, doped to 60 ppm P with $H_3PO_4$ and heat treated at 1475° C. (1748° K) for 30 minutes ($1.8 \times 10^3$ seconds) under high vacuum of less than $10^{-5}$ Torr. The capacitance of this product was 17,500 $\mu$FV/g when Ta powder was pressed into pellets, sintered at 1480° C. (1753° K), and anodized to 50 V; 13,600 $\mu$FV/g when sintered at 1560° C. (1833° K) and anodized to 80 V.

EXAMPLE 1

A nickel reactor of appropriate size, fitted with a lid, agitator, thermowell, gas inlet and outlet ports, and loading ports, was placed in a furnace and flushed with argon. Argon flow was maintained throughout the run. A 300 lb (136 kg) mixture of alkali halide diluent salts, as in Example 1, were charged to the reactor and the temperature was raised to 825° C. (1098° K) to melt the salts under agitation. At this point, 28 pounds (12.7 kg) of $K_2TaF_7$ (1/10 of the total amount of $K_2TaF_7$ to be added) was put into the reactor through a feed port and the molten diluents were stirred to dissolve the added $K_2TaF_7$ salt. When the temperature of the molten salts returned to 825° C. (1098° K), sodium flow was started at 0.7 pound (0.32 kg)/minute (60 seconds). The sodium flow was maintained at this constant rate throughout the reduction. When 80% of the first 28 pounds (12.7 kg) $K_2TaF_7$ charge had been converted to Ta, an additional 28 pounds (12.7 kg) of $K_2TaF_7$ was added. $K_2TaF_7$ additions were made in 28 pound (12.7 kg) increments corresponding to the time when an unreacted 5.6 pounds (2.5 kg) of $K_2TaF_7$ remained from the previous addition. The final 28 pound (12.7 kg) increment brings the total $K_2TaF_7$ added to 280 pounds (127 kg). Sodium flow was maintained at a constant rate throughout until 82.6 pounds (37.5 kg) had been added.

After all the sodium had been added, the reduction mass was heated to 900° C. (1173° K) for 4 hours ($1.44 \times 10^4$ seconds) under argon to insure completeness of the reduction of $K_2TaF_7$ to tantalum metal. The reactor was cooled to room temperature under argon and the contents were removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 5000 cm$^2$/g. A sample of powder was screened to $-60$ mesh, doped to 60 ppm P with $H_3PO_4$ and heat treated at 1475° C. (1748° K) for 30 minutes ($1.8 \times 10^3$ seconds) under high vacuum. The capacitance of this product was 18,700 $\mu$FV/g when the Ta powder was pressed into pellets, sintered at 1480° C. (1753° K), and anodized to 50 V; 15,100 $\mu$FV/g when sintered at 1560° C.(1833° K) and anodized to 80 V.

COMPARATIVE EXAMPLE 3

A nickel reactor of appropriate size, fitted with a lid, agitator, thermowell, gas inlet and outlet ports, and loading ports, was placed in a furnace and flushed with argon. Argon flow was maintained throughout the run. Two hundred seventy pounds (122.5 kg) of alkali halide diluent salts were charged to the reactor and the temperature was raised to 825° C. (1098° K) to melt the salts under agitation. At this point, 280 pounds (127 kg) of $K_2TaF_7$ was added with agitation, the $K_2TaF_7$ dissolved in the diluent salts, and the temperature was brought back to 825° C. (1098° K). Liquid sodium was added at 0.7 pound (0.32 kg)/minute (60 seconds) until 82.6 pounds (37.5 kg) of sodium had been added. The temperature of the reduction was maintained at 825° C. (1098° K). After all the sodium had been added, the reduction mass was heated to 900° C. (1173° K) for 4 hours ($1.44 \times 10^4$ seconds) under argon to insure completeness of the reduction of $K_2TaF_7$ to tantalum metal. The reactor was cooled to room temperature under argon and the contents were then removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 2850 cm$^2$/g.

A sample of powder was screened to $-60$ mesh, doped to 60 ppm P with $H_3PO_4$ and heat treated at 1475° C. (1748° K) for 30 minutes ($1.8 \times 10^3$ seconds) under high vacuum. The capacitance of this product was 10,400 $\mu$FV/g when Ta powder was pressed into pellets, sintered at 1480° C. (1753° K), and anodized to 50 V; 8600 $\mu$FV/g when sintered at 1560° C. (1833° K) and anodized to 80 V.

EXAMPLE 4

A nickel reactor of appropriate size, fitted with a lid, agitator, thermowell, gas inlet and outlet ports, and loading ports, was placed in a furnace and flushed with argon. Two hundred seventy pounds (122.5 kg) of alkali halide diluent salts, as in Example 3, were charged to the reactor and the temperature was raised to 825° C. (1098° K). At this point, 93.3 pounds (42.3 kg) of $K_2TaF_7$ (1/3 of the total amount of $K_2TaF_7$ to be added) was put into the reactor through a feed port and the molten diluents stirred to dissolve the added $K_2TaF_7$ salt. When the temperature of the molten salts returned to 825° C. (1098° K), sodium flow was started at 0.7 pounds (0.32 kg)/minute (60 seconds). The Na flow was mantained at this constant rate throughout the reduction. When 80% of the first 93.3 lbs (42.3 kg) of $K_2TaF_7$ charge had been converted to Ta, an additional 93.3 pounds (42.3 kg) of $K_2TaF_7$ was added. $K_2TaF_7$ additions were made in 93.3 pound (42.3 kg) increments corresponding to the time when an unreacted 18.66 pounds (8.46 kg) of $K_2TaF_7$ remained from the previous addition. The final 93.3 pound (42.3 kg) increment brought the total $K_2TaF_7$ added to 280 pounds (127 kg). Sodium flow was maintained at a constant rate throughout until 82.6 pounds (37.5 kg) had been added. Argon atmosphere was maintained throughout the course of the reduction.

After all the sodium had been added, the reduction mass was heated to 900° C. (1173° K) for 4 hours ($1.44 \times 10^4$ seconds) under argon to insure completeness of the reduction of $K_2TaF_7$ to tantalum metal. The reactor was cooled to room temperature under argon flow and the contents were then removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 3025 cm$^2$/g.

A sample of powder was screened to $-60$ mesh, doped to 60 ppm P with $H_3PO_4$ and heat treated at 1475° C. (1748° K) for 30 minutes ($1.8 \times 10^3$ seconds) under high vacuum. The capacitance of this product was 10,950 $\mu$FV/g when the Ta powder was pressed into pellets and sintered at 1480° C. (1753° K), and anodized to 50 V; 9180 $\mu$FV/g when sintered at 1560° C. (1833° K) and anodized to 80 V.

EXAMPLE 5

A nickel reactor of appropriate size, fitted with a lid, agitator, thermowell, gas inlet and outlet ports, and loading ports, was placed in a furnace and flushed with argon. Two hundred seventy pounds (122.5 kg) diluent salts were charged to the reactor, as in Example 3, and the temperature was raised to 825° C. (1098° K) to melt the salts under agitation. Argon flow was maintained throughout the run. At this point, 46.67 pounds (21.17 kg) of $K_2TaF_7$ (1/6 of the total amount of $K_2TaF_7$ to be added) was put into the reactor through a feed port and the molten diluents stirred to dissolve the added $K_2TaF_7$ salt. When the temperature of the molten salts returned to 825° C. (1098° K), sodium flow was started at 0.7 pound (0.32 kg)/minute (60 seconds). The sodium flow was maintained at this constant rate throughout the reduction. When 80% of the first 46.67 (21.17 kg) pounds $K_2TaF_7$ charge had been converted to Ta, an additional 46.67 pounds (21.17 kg) of $K_2TaF_7$ was added. $K_2TaF_7$ additions were made in 46.67 pound (21.17 kg) increments corresponding to the time when an unreacted 9.33 pounds (4.23 kg) of $K_2TaF_7$ remained from the previous addition. The final 46.67 pound (21.17 kg) increment brought the total $K_2TaF_7$ added to 280 pounds (127 kg). Sodium flow was maintained at a constant rate throughout until 82.6 pounds (37.5 kg) had been added.

After all the sodium had been added, the reduction mass was heated to 900° C. (1173° K) for 4 hours ($1.44 \times 10^4$ seconds) under argon to insure completeness of the reduction of $K_2TaF_7$ to tantalum metal. The reactor was cooled to room temperature under argon flow and the contents were then removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 3625 cm$^2$/g.

A sample of powder was screened to −60 mesh, doped to 60 ppm P with $H_3PO_4$ and heat treated at 1475° C. (1748° K) for 30 minutes ($1.8 \times 10^3$ seconds) under high vacuum. The capacitance of this product was 12,690 μFV/g when pellets were pressed into pellets, sintered at 1480° C. (1753° K), and anodized to 50 V; 10,900 μFV/g when sintered at 1560° C. (1833° K) and anodized to 80 V.

EXAMPLE 6

A nickel reactor of appropriate size, fitted with a lid, agitator, thermowell, gas inlet and outlet ports, and loading ports, was placed in a furnace and flushed with argon. Two hundred seventy pounds (122.4 kg) of alkali halide diluent salts were charged, as in Example 3, to the reactor and the temperature was raised to 825° C. (1098° K) to melt the salts under agitation. Argon flow was maintained throughout the run. At this point, 28 pounds (12.7 kg) of $K_2TaF_7$ (1/10 of the total amount of $K_2TaF_7$ to be added) was put into the reactor through a feed port and the molten diluents stirred to dissolve the added $K_2TaF_7$ salt. When the temperature of the molten salts returned to 825° C. (1098° K), sodium flow was started at 0.7 pound (0.32 kg)/minute (60 seconds). The sodium flow was maintained at this constant rate throughout the reduction. When 80% of the first 28 pounds (12.7 kg) $K_2TaF_7$ charge had been converted to Ta, an additional 28 pounds (12.7 kg) of $K_2TaF_7$ was added. $K_2TaF_7$ additions were made in 28 pound (12.7 kg) increments corresponding to the time when an unreacted 5.6 pounds (2.5 kg) of $K_2TaF_7$ remained from the previous addition. The final 28 pound (12.7 kg) increment brought the total $K_2TaF_7$ added to 280 pounds (127 kg). Sodium flow was maintained at a constant rate throughout until 82.6 pounds (37.5 kg) had been added.

After all the sodium has been added, the reduction mass was heated to 900° C. (1173° K) for 4 hours ($1.44 \times 10^4$ seconds) under argon to insure completeness of the reaction of $K_2TaF_7$ to tantalum metal. The reactor was cooled to room temperature under argon flow and the contents were then removed. The mass of salt and tantalum powder was processed by leaching with appropriate solvents to dissolve the salts and recover the tantalum powder. The tantalum powder product was dried at 80° C. (353° K). The BET surface area of the as-reduced powder was determined to be 3975 cm$^2$/g. A sample of powder was screened to −60 mesh, doped to 60 ppm P with $H_3PO_4$ and heat treated at 1475° C. (1748° K) for 30 minutes ($1.8 \times 10^3$ seconds) under high vacuum. The capacitance of this product was 13,750 μFV/g when pellets were pressed into pellets sintered at 1480° C. (1753° K), and anodized to 50 V; 12,000 μFV/g when sintered at 1560° C. (1833° K) and anodized to 80 V.

EXAMPLE 7

A nickel reactor of appropriate size was fitted with a lid, agitator, thermowell, argon gas inlet and outlet ports, and loading ports. The reactor was placed in a furnace, dried, and flushed with an inert gas (argon). One hundred ninety six pounds (88.9 kg) of alkali metal halide diluent salts were charged to the reactor. The temperature was increased to melt the salts and the agitator was turned on. At 627° C. (900° K), 11.2 lb (5.1 kg) of molten sodium metal was charged into the reactor. Then 34.0 lb (15.4 kg) of solid $K_2TaF_7$ was charged into the reactor over a period of about 10 seconds. Due to the exothermic nature of the reaction, the temperature within the reactor increased to 709° C. (982° K). The reaction products were then heated to 850° C. (1123° K), and held for 4.5 hours ($1.62 \times 10^4$ seconds) under agitation. The mass of salt and tantalum powder was then cooled to room temperature, and processed by leaching with water to dissolve the salts. The tantalum was then leached with hydrofluoric acid, washed with water, and dried. The tantalum powder recovered from this reaction had an unusually uniform particle size ranging primarily from 0.6 to 1.2 μm in diameter. The BET surface area of the as-reduced powder was determined to be 15300 cm$^2$/g. A sample of the −60 mesh fraction of the powder was doped to 175 ppm phosphorus with $H_3PO_4$, and then heated at 100° C. (373° K) to evaporate residual water. The capacitance of this product was 22,740 μFV/g when pressed into pellets, sintered at 1480° C. (1753° K), and anodized to 50 V.

EXAMPLE 8

A nickel reactor of appropriate size was fitted with a lid, agitator, thermowell, argon gas inlet and outlet ports, and loading ports. The reactor was placed in a furnace, dried, and flushed with an inert gas (argon). Two hundred pounds (90 kg) of alkali metal halide diluent salts were added to the reactor, and heated to 730° C. (1003° K) to melt the salts. The agitator was then turned on. Six pounds (2.7 kg) of sodium was then charged into the reactor followed by 20 lb (9.1 kg) of $K_2TaF_7$. When the reacting mixture had cooled again to 730° C. (1003° K), another 6 lb (12.7 kg) of sodium followed by 20 lb (9.1 kg) of $K_2TaF_7$ was again charged into the reactor. The reacting mixture was again allowed to cool to 730° C. (1003° K), and another 6 lb (2.7 kg) of sodium followed by another 20 lb (9.1 kg) of $K_2TaF_7$ were charged to the reactor. This cycle continued three more times until a total of 36 lb (16.3 kg) of sodium and 120 lb (54.4 kg) of $K_2TaF_7$ had been added to the reactor. The tantalum and salts were then heated to 860° C. (1133° K) and held under agitation for 4.0 hours ($1.44 \times 10^4$ seconds). The tantalum powder was recovered from the mixture of salt and metal in the same manner described in Example 7. The BET surface area of the as-reduced powder was determined to be 8100 cm$^2$/g. A sample of the −60 mesh fraction of the powder was doped with 150 ppm phosphorus using $H_3PO_4$, and then heated at 100° C. (373° K) to evaporate any residual water. The capacitance of this product was 28,000 μFV/g when pressed into pellets, sintered at 1480° C. (1753° K), and anodized to 50 V.

EXAMPLE 9

A nickel reactor of appropriate size was fitted with a lid, agitator, thermowell, argon gas inlet and outlet ports, and loading ports. The reactor was placed in a furnace dried, and flushed with an inert gas (argon). One hundred sixty pounds (72.6 kg) of alkali metal halide diluent salts were charged to the reactor, and heated to 780° C. (1073° K) to melt the salts. The agitator was turned on. Sodium was then added to the reactor at a rate of 1.0 lb (0.45 kg)/minute (60 seconds) and $K_2TaF_7$ was continuously added at a rate of 3.0 to 3.5 lb (1.4 to 1.6 kg)/minute (60 seconds) until a total of 55.6 (25.2 kg) of sodium and 180 lb (81.6 kg) of $K_2TaF_7$ had been added. After all of the sodium and $K_2TaF_7$ had been added, the reaction products were heated to 860° C. (1173° K) and held under agitation for 4.0 hours ($1.44 \times 10^4$ seconds). The tantalum was recovered from the mixture of metal and salt in the same manner described in Example 7. The BET surface area of the as-reduced powder was determined to be 7700 $cm^2/g$. A $-60$ mesh sample of the powder was doped to 150 ppm phosphorus using $H_3PO_4$ and the tantalum was then heated at 100° C. (373° K) to evaporate any residual water. The capacitance of this tantalum was 27,200 $\mu FV/g$ when pressed into pellets, sintered at 1480° C. (1753° K), and anodized to 50 volts. The capacitance of the tantalum was 15,310 $\mu FV/g$ when pressed into pellets, sintered at 1560° C. (1833° K), and anodized to 80 V.

The embodiments of the invention in which an exclusive property or privilege is claimed are defined as follows:

1. In a process for producing capacitor grade tantalum powder wherein a tantalum compound is reduced to tantalum metal by reaction with a reducing metal, the improvement characterized by introducing the tantalum compound and the reducing metal in a continuous or incremental manner to the reactor during the course of the reduction reaction.

2. The process of claim 1 wherein the tantalum compound is selected from potassium fluotantalate, sodium fluotantalate, tantalum chloride, and mixtures thereof.

3. The process of claim 1 wherein the reducing metal is selected from sodium, potassium, and mixtures thereof.

4. The process of claim 1 wherein potassium fluotantalate is reduced to tantalum metal by reaction with sodium.

5. The process of claim 4 wherein the potassium fluotantalate is introduced into the reactor in increments ranging from about one half to about one twentieth of the total tantalum compound charge.

6. The process of claim 1 wherein sodium is introduced at a rate ranging from about 0.2 to about 15.0 pounds (0.09 to about 6.80 kg) per minute (60 seconds).

7. The process of claim 4 wherein the reduction reaction is maintained at a temperature ranging from about 600° to about 950° C. (873° to about 1223° K).

8. In a process for producing columbium powder wherein a columbium compound is reduced to columbium metal by reaction with a reducing metal, the improvement characterized by introducing the columbium compound in a continuous or incremental manner to the reactor during the course of the reduction reaction.

9. In a process for producing capacitor grade tantalum powder wherein a tantalum compound is reduced to tantalum metal by reaction with a reducing metal, the improvement characterized by introducing a solid tantalum compound in a continuous or incremental manner to the reactor with agitation during the course of the reduction reaction.

10. The process of claim 9 wherein the reducing metal is introduced to the reaction mixture as a unitary charge prior to the introduction of the tantalum compound.

* * * * *